(12) United States Patent
Ahn (10) Patent No.: US 9,478,781 B2
(45) Date of Patent: Oct. 25, 2016

(54) ELECTRODE ASSEMBLY AND SECONDARY BATTERY USING THE SAME

(75) Inventor: Chang-Bum Ahn, Yongin-si (KR)

(73) Assignee: SAMSUNG SDI CO., LTD., Yongin-Si, Gyeonggi-do (KR)

( * ) Notice: Subject to any disclaimer, the term of this patent is extended or adjusted under 35 U.S.C. 154(b) by 1198 days.

(21) Appl. No.: 13/137,902

(22) Filed: Sep. 21, 2011

(65) Prior Publication Data

US 2012/0237819 A1 Sep. 20, 2012

(30) Foreign Application Priority Data

Mar. 16, 2011 (KR) ........................ 10-2011-0023348

(51) Int. Cl.
*H01M 2/02* (2006.01)
*H01M 10/02* (2006.01)
*H01M 4/04* (2006.01)
*H01M 2/16* (2006.01)
*H01M 4/66* (2006.01)
*H01M 10/04* (2006.01)
*H01M 10/052* (2010.01)
*H01M 10/0583* (2010.01)
*H01M 2/26* (2006.01)
*H01M 2/36* (2006.01)

(52) U.S. Cl.
CPC ......... *H01M 2/1673* (2013.01); *H01M 2/1653* (2013.01); *H01M 4/661* (2013.01); *H01M 10/0459* (2013.01); *H01M 10/052* (2013.01); *H01M 10/0583* (2013.01); *H01M 2/26* (2013.01); *H01M 2/36* (2013.01); *Y02E 60/122* (2013.01); *Y02P 70/54* (2015.11); *Y10T 29/49115* (2015.01)

(58) Field of Classification Search
CPC .. H01M 2/02; H01M 2/1673; H01M 2/1653; H01M 10/0459; H01M 10/052; H01M 10/0583; H01M 4/04; H01M 4/661
USPC ................................. 429/153, 163; 29/623.5
See application file for complete search history.

(56) References Cited

U.S. PATENT DOCUMENTS

| 2001/0049872 | A1 | 12/2001 | Hong | |
|---|---|---|---|---|
| 2005/0284750 | A1* | 12/2005 | Nishimura et al. | ........... 204/252 |
| 2011/0151295 | A1* | 6/2011 | Kim | ................................ 429/94 |

FOREIGN PATENT DOCUMENTS

| KR | 10 2000-0051741 A | | 8/2000 | |
| KR | 10-2001-0019700 A | | 3/2001 | |
| KR | 1019990036252 A | * | 3/2001 | ............ H01M 10/04 |
| KR | 10 2001-0111682 A | | 12/2001 | |
| KR | 10-2004-0095851 A | | 11/2004 | |

OTHER PUBLICATIONS

Korean Notice of Allowance dated Jun. 28, 2013.
Korean Office Action Dated Jan. 9, 2013.

* cited by examiner

*Primary Examiner* — Karie O'Neill Apicella
(74) *Attorney, Agent, or Firm* — Lee & Morse, P.C.

(57) ABSTRACT

An electrode assembly includes a porous polymer layer, a conductive layer on each of a first and a second surface of the porous polymer layer, and an active material layer on each of the first and second surfaces of the porous polymer layer.

20 Claims, 4 Drawing Sheets

ELECTRODE ASSEMBLY AND SECONDARY BATTERY USING THE SAME

BACKGROUND

1. Field

An aspect of example embodiments relates to an electrode assembly and a secondary battery using the same, and more particularly, to a simply manufactured electrode assembly and a secondary high-power battery using the same.

2. Description of the Related Art

In a secondary battery, for example, a jelly-roll type electrode assembly may be formed by winding a positive electrode plate, a negative electrode plate, and a separator interposed therebetween. In this instance, a positive electrode tab and a negative electrode tab may be fused and bonded to non-coating portions, respectively.

In another example, a stack-type electrode assembly may be formed by sequentially stacking a plurality of separate positive electrode plates and negative electrode plates with a separator interposed therebetween. In this instance, a positive electrode tab and a negative electrode tab may be extracted from each of the positive electrode plates and each of the negative electrode plates, respectively.

SUMMARY

Embodiments provide an electrode assembly and a secondary battery using the same in which positive and negative electrode active materials are coated on opposite surfaces of a porous polymer layer, on which a material with conductivity is coated, followed by folding the coated porous polymer layer in a zigzag shape to form the electrode assembly.

According to example embodiments, there is provided an electrode assembly including a porous polymer layer having first and second surfaces opposite each other, a conductive layer on each of the first and second surfaces of the porous polymer layer, and an active material layer on each of the first and second surfaces of the porous polymer layer.

The porous polymer layer may include polyethylene terephthalate (PET).

The conductive layer may include aluminum (Al).

The conductive layer may be porous.

The conductive layer and the porous polymer layer may have a ventilation rate of about 100 sec/ml to about 400 sec/ml.

The porous polymer layer may have a thickness of about 30 μm to about 100 μm.

The conductive layer may have a thickness of about 10 μm to about 50 μm.

The active material layers on each of the first and second surfaces of the porous polymer layer may include first and second active material layers, respectively, the first and second active material layers being different from each other.

The first and second active material layers may have positive and negative polarities, respectively.

Each of the first and second active material layers may include a plurality of discontinuous portions spaced apart from each other along a longitudinal direction of the porous polymer layer, portions of the conductive layer being exposed between adjacent discontinuous portions of the first and second active material layers to define non-coating portions.

The porous polymer layer may have a zigzag shape, the non-coating portions being bent and positioned at edges of the zigzag shape.

First and second electrode tabs may be bonded to the non-coating portions.

The active material layer may include a plurality of discontinuous portions on each of the first and second surfaces of the porous polymer layer, the discontinuous portions being arranged to expose portions of the conductive layer therebetween.

The porous polymer layer may be bent at the exposed portions of the conductive layer, the plurality of discontinuous portions of the active material layer overlapping each other.

Discontinuous portions of the porous polymer layer directly facing each other may have a same polarity, discontinuous portions on opposite surfaces of the porous polymer layer having opposite polarities.

The conductive layer may be between the active material layer and each of the first and second surfaces of the porous polymer layer.

The active material layer may expose portions of the conductive layer on each of the first and second surfaces of the porous polymer layer to define non-coated portions of the electrode assembly, the porous polymer layer being bent to have the non-coated portions of the electrode assembly arranged at opposite edges of the electrode assembly.

According to other example embodiments, there is provided a secondary battery, including an electrode assembly, the electrode assembly having a porous polymer layer, a conductive layer on each of a first and a second surface of the porous polymer layer, and an active material layer on each of the first and second surfaces of the porous polymer layer, a can configured to accommodate the electrode assembly and an electrolyte, and a cap assembly configured to seal the can. The electrolyte may be flame resistant.

According to other example embodiments, there is provided a method of manufacturing an electrode assembly, the method including coating a conductive layer on each of a first and a second surface of a porous polymer layer, coating an active material layer on each of the first and second surfaces of the porous polymer layer, such that the active material layer exposes portions of the conductive layer on each of the first and second surfaces of the porous polymer layer, and bending the porous polymer layer in a bent structure, such that the exposed portions of the conductive layer are arranged at opposite edges of the bent structure.

BRIEF DESCRIPTION OF THE DRAWINGS

The above and other features and advantages will become more apparent to those of ordinary skill in the art by describing in detail exemplary embodiments with reference to the attached drawings, in which.

DETAILED DESCRIPTION

Korean Patent Application No. 10-2011-0023348, filed on Mar. 16, 2011, in the Korean Intellectual Property Office, and entitled: "Electrode Assembly and Secondary Battery Using the Same" is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when an element (or layer) is referred to as being "on" another element or substrate, it can be directly on the other element or substrate, or intervening elements may also be present. In addition, it will also be understood that when an element is referred to as being "between" two elements, it can be the only element between the two elements, or one or more intervening elements may also be present. Further, when an element is referred to as being "connected to" another element, it can be directly connected to the other element or be indirectly connected to the other element with one or more intervening elements interposed therebetween. Like reference numerals refer to like elements throughout.

Hereinafter, example embodiments will be described in detail with reference to the accompanying drawings.

Figure 1:
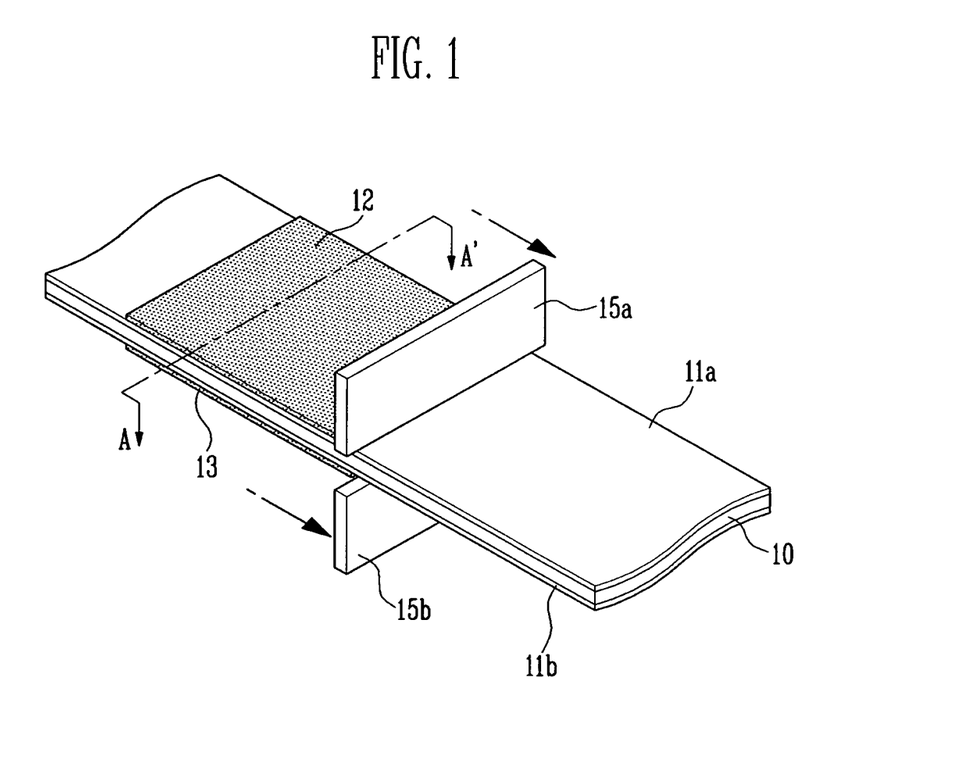
FIG. 1 illustrates a perspective view of a process of coating a positive electrode active material and a negative electrode active material on a porous polymer layer according to an embodiment.

FIG. 1 illustrates a perspective view of a process of coating a positive electrode active material and a negative electrode active material on a porous polymer layer according to an embodiment Referring to FIG. 1, in the manufacture of an electrode assembly according to an example embodiment, electrode material may be coated on a porous polymer layer 10 having first and second conductive layers 11a and 11b on respective first and second surfaces 10a and 10b thereof. In detail, as illustrated in FIG. 1, the porous polymer layer 10 may be moved, i.e., transferred and passed in a direction opposite to the arrows in FIG. 1, between facing first and second coating apparatuses 15a and 15b, such that the first and second coating apparatuses 15a and 15b may face the first and second conductive layers 11a and 11b, respectively. A positive electrode active material layer 12 may be coated on the first conductive layer 11a using a positive electrode slurry supplied from the first coating apparatus 15a, i.e., a positive electrode active material coating apparatus 15a. Similarly, a negative electrode active material layer 13 may be coated on the second conductive layer 11b using a negative electrode slurry supplied from the second coating apparatus 15b, i.e., a negative electrode active material coating apparatus 15b.

For example, the positive electrode slurry may be prepared by mixing a positive electrode active material, a conducting agent, and a positive electrode binder in a solvent. The positive electrode active material generates electrons by participating in a positive electrode chemical reaction of a lithium secondary battery, and the conducting agent transfers the electrons generated in the positive electrode active material to the first conductive layer 11a. For example, lithium complex metal oxides, e.g., $LiCoO_2$, $LiMn_2O_4$, $LiNiO_2$, $LiNi_{1-x}Co_xO_2(0<x<1)$, and $LiMnO_2$, may be used as the positive electrode active material. However, example embodiments are not limited thereto.

For example, the negative electrode slurry may be prepared by mixing a negative electrode active material and a negative electrode binder. Here, any one of, e.g., hard carbon, soft carbon, and graphite, may be used as the negative electrode active material. However, example embodiments are not limited thereto.

The porous polymer layer 10 formed as described above serves as a separator in the electrode assembly. Accordingly, a plurality of pores for moving lithium ions may be formed in the porous polymer 10.

For example, the first and second conductive layers 11a and 11b may be coated on the first and second, e.g., upper and lower, surfaces 10 and 10b of the porous polymer 10, so that the porous polymer layer 10 may serve as a collector having conductivity. Further, the porous polymer layer 10 may improve the adhesion between the positive and negative electrode active layers 12 and 13. As the positive and negative electrode active material layers 12 and 13 are formed, e.g., simultaneously, on the respective first and second conductive layers 11a and 11b, a battery may be simultaneously manufactured while coating positive and negative electrode active materials.

Figure 2:
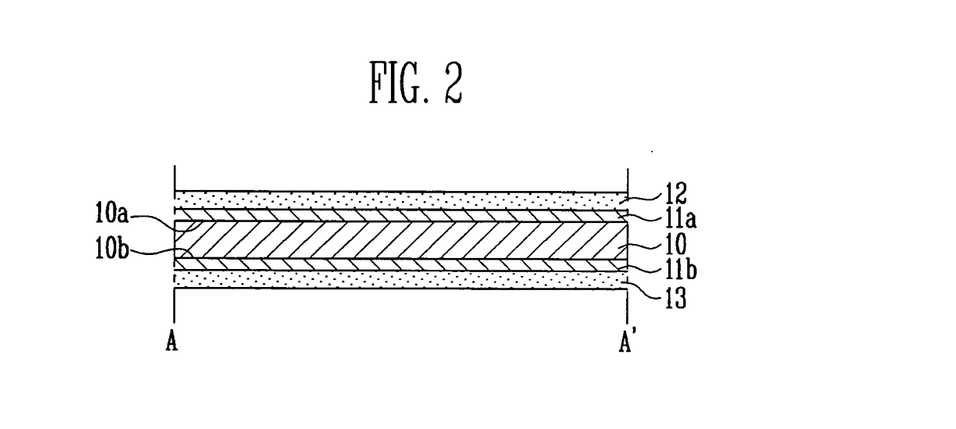
FIG. 2 illustrates a cross-sectional view along line A-A' of FIG. 1.

FIG. 2 illustrates a cross-sectional view taken along line A-A' of FIG. 1. In FIG. 2, the cross-sectional view along line A-A' illustrates the positive and negative electrode active materials 12 and 13 after being coated on the respective first and second conductive layers 11a and 11b.

Referring to FIG. 2, the first conductive layer 11a may be formed on the porous polymer layer 10, and the positive electrode active material layer 12 may be formed on the first conductive layer 11a, i.e., the first conductive layer 11a may be between the porous polymer layer 10 and the positive electrode active material layer 12. The second conductive layer 11b may be formed beneath the porous polymer layer 10, and the negative electrode active material 13 may be formed beneath the second conductive layer 11b, i.e., the second conductive layer 11b may be between the porous polymer layer 10 and the negative electrode active material layer 13. In other words, as illustrated in FIG. 2, the second conductive layer 11b, the porous polymer layer 10, the first conductive layer 11a, and the positive electrode active material layer 12 may be sequentially positioned on the negative electrode active material 13.

For example, the porous polymer layer 10 may be formed of polyethylene terephthalate (PET). The PET is an insulating material, and may serve as a separator. The first and second conductive layers 11a and 11b may be formed of, e.g., aluminum (Al), and may be porous. The first and second conductive layers 11a and 11b are formed to be porous, so that the charge/discharge of the battery may be possible while lithium ions freely move between the positive and negative electrode active material layers 12 and 13.

In this instance, the porous polymer layer 10 may be formed to have a thickness of about 30 μm to about 100 μm, i.e., as measured between the first and second surfaces 10a and 10b. If the thickness of the porous polymer 10 is less than 30 μm, the thickness may be too small, thereby causing a short circuit due to a minute current flowing through the small thickness of the porous polymer layer 10. If the thickness of the porous polymer 10 exceeds 100 μm, an overall thickness of the electrode assembly may be increased.

Further, each of the first and second conductive layers 11a and 11b may be formed to have a thickness of about 10 μm to about 50 μm. If the thickness of the conductive layer 11a or 11b is less than 10 μm, its implementation in a process may be difficult, and its resistance may be increased. If the thickness of the conductive layer 11a or 11b exceeds 50 μm, no appreciable improvement in operation is realized so increase in thickness is not warranted.

Furthermore, the porous polymer layer 10 and the first and second conductive layers 11a and 11b may have a ventilation rate of about 100 sec/ml to about 400 sec/ml. If the ventilation rate is less than 100 sec/ml, a failure may be caused by a minute short circuit. If the ventilation rate exceeds 400 sec/ml, a kinetic balance required for achieving high-rate characteristics may be difficult to provide. Here, the ventilation rate refers to a time required for air of 100 cc, i.e., air having a volume of 100 ml, to pass a predetermined area.

Figure 3A:
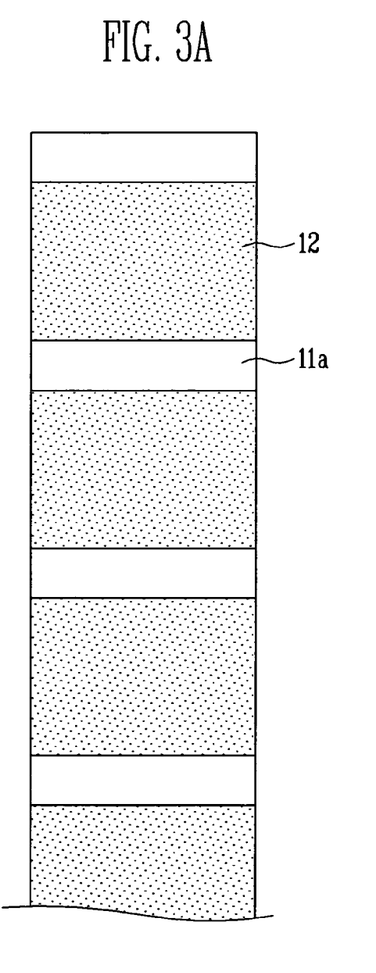
FIG. 3A illustrates a plan view of a coated positive electrode active material on the porous polymer layer of FIG. 1.
Figure 3B:
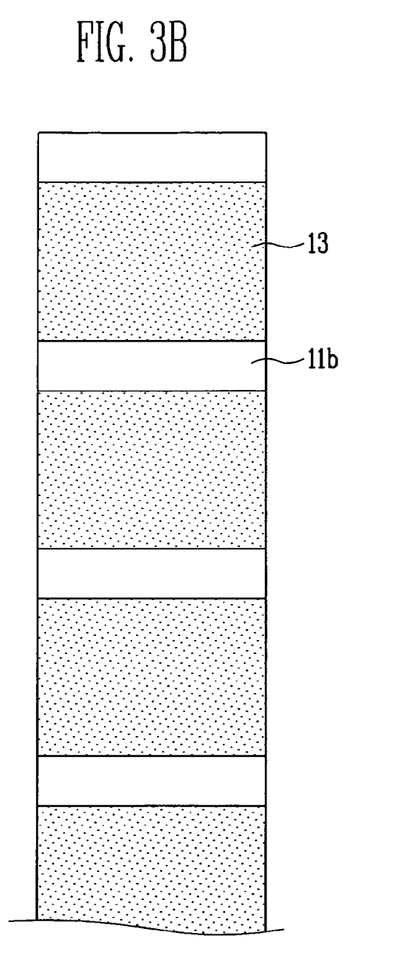
FIG. 3B illustrates a plan view of a coated negative electrode active material on the porous polymer layer of FIG. 1.

FIG. 3A illustrates a plan view of the positive electrode active material on the porous polymer layer 10. FIG. 3B illustrates a plan view of the negative electrode active material on the porous polymer layer 10.

As illustrated in FIG. 3A, the positive electrode active material layer 12 is coated on the porous polymer layer 10. The positive electrode active material layer 12 may be intermittently coated on the first conductive layer 11a of the porous polymer layer 10. In other words, the positive electrode active material layer 12 may include a plurality of discontinuous portions on the first conductive layer 11a, so portions of the positive electrode active material layer 12 and portions of the first conductive layer 11a not covered by the positive electrode active material layer 12 may be alternately arranged. That is, the positive electrode active material layer 12 may be referred to as a coating portion at which the positive electrode active material is coated, and the first conductive layer 11a may be referred to as a non-coating portion at which the positive electrode active material is not coated.

As illustrated in FIG. 3B, the negative electrode active material layer 13 is coated on the porous polymer layer 10. The negative electrode active material layer 13 may be intermittently coated on the second conductive layer 11b of the porous polymer layer 10. In other words, the negative electrode active material layer 13 may include a plurality of discontinuous portions on the second conductive layer 11b, so portions of the negative electrode active material layer 13 and portions of the second conductive layer 11b not covered by the negative electrode active material layer 13 may be alternately arranged. That is, the negative electrode active material layer 13 may be referred to as a coating portion at which the positive electrode active material is coated, and the second conductive layer 11b may be referred to as a non-coating portion at which the positive electrode active material is not coated.

For example, the conductive layer may be formed beneath the positive electrode active material layer 12, i.e., and not beneath the negative electrode layer 13. That is, as the positive electrode active material layer 12 is generally a crystalline oxide having no conductivity, i.e., as opposed to the negative electrode active material layer 13 having conductivity, the conductive layer may be formed between the porous polymer layer 10 and the positive electrode layer 12. For example, the second conductive layer 11b may be formed as a discontinuous layer only between discontinuous portions of the negative electrode active material 13.

The non-coating portions at which the positive and negative electrode active material layers 12 and 13 are not coated, i.e., the exposed portions of the first and second conductive layers 11a and 11b, may be formed at a same position on the first and second surfaces 10a and 10b of the porous polymer layer 10. In other words, portions of the positive electrode active material layer 12 may overlap portions of the negative electrode active material layer 13, so exposed portions of the first and second conductive layers 11a and 11b may overlap each other.

Figure 4:
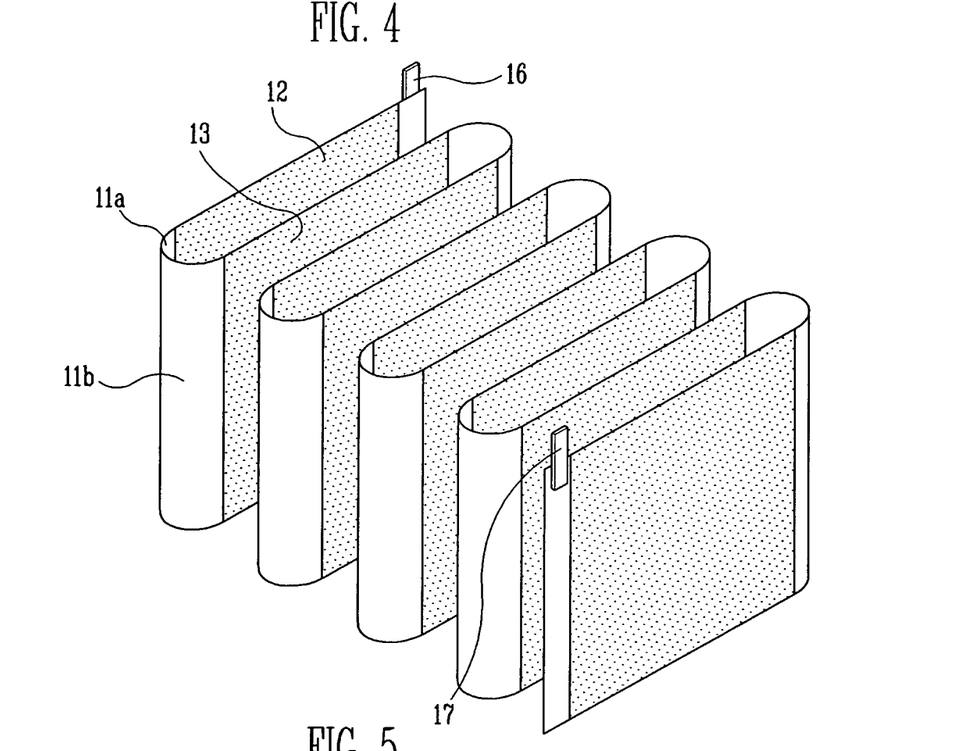
FIG. 4 illustrates a perspective view of coated positive and negative electrode active materials on a bent porous polymer layer according to an embodiment.
Figure 5:
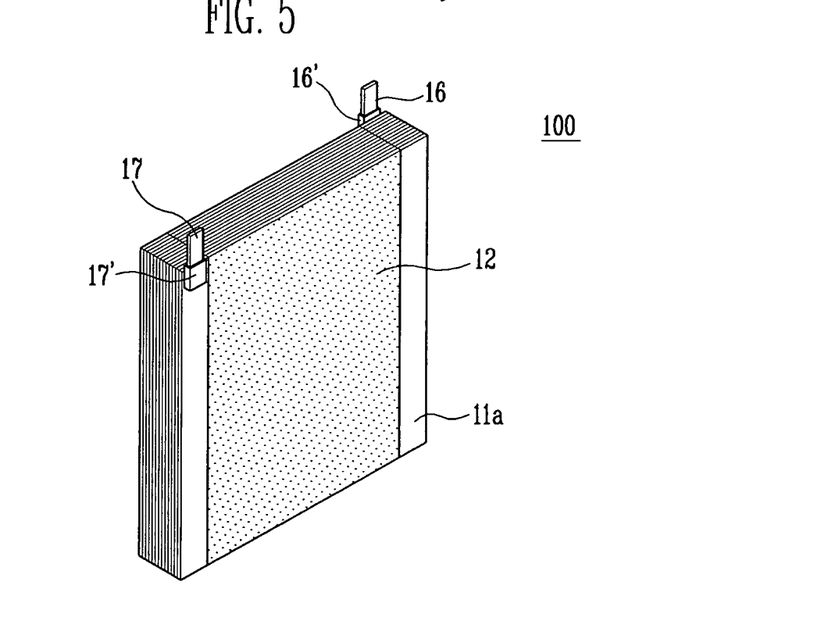
FIG. 5 illustrates a perspective view of an electrode assembly according to an embodiment.

FIG. 4 illustrates a perspective view of the coated positive and negative electrode active materials 12 and 13 on a folded porous polymer layer 10. FIG. 5 illustrates a perspective view of an electrode assembly according to an embodiment.

Referring to FIGS. 4 and 5, the porous polymer layer 10 having the positive and negative electrode active material layers 12 and 13 respectively coated on the first and second surfaces thereof (see FIG. 1) may be folded, e.g., in a zigzag shape. For example, portions where the positive and negative electrode active material layers 12 and 13 that are not coated, i.e., portions at which the respective conductive layers 11a and 11b are exposed, may be folded, so that the porous polymer layer 10 may be folded to have the discontinuous portions of the positive and negative electrode active material layers 12 and 13 overlap each other to form a zigzag shape. For example, as illustrated in FIG. 4, every other exposed portion of the first conductive layer 11a may be folded, so two portions of the positive electrode active material layer 12 adjacent to each other and to the folded portion of the first conductive layer 11a may face each other.

Accordingly, the porous polymer layer 10 may be folded so that the portions of the positive electrode active material layer 12 may contact each other, and the portions of the negative electrode active material layer 13 may contact with each other when forming an electrode assembly 100 (FIG. 5). Thus, a short circuit may not occur.

Positive and negative electrode tabs 16 and 17 may be attached to the exposed first and second conductive layers 11a and 11b, respectively. The positive and negative electrode tabs 16 and 17 may be bonded to the respective first and second conductive layers 11a and 11b, e.g., through fusion bonding. In this instance, the positive and negative electrode tabs 16 and 17 are spaced apart so as not to come in contact with each other. As illustrated in FIG. 5, lamination tapes 16' and 17' may be wound around portions at which the positive and negative electrode tabs 16 and 17 are extracted from the electrode assembly, respectively. The lamination tape 16' or 17' shields heat generated from the positive or negative electrode tab 16 or 17 and allows the electrode assembly not to be pressed by an edge of the positive or negative electrode tab 16 or 17.

For example, the positive electrode tab 16 may be formed of nickel (Ni), and the negative electrode tab 17 may be formed of copper (Cu). However, example embodiments are not limited thereto.

An electrode assembly according to example embodiments as described above may be simultaneously provided with positive and negative electrode collectors. Thus, it may be unnecessary to coat the active material on separate positive and negative electrode collectors. That is, as the positive and negative electrode active material layers are coated simultaneously on opposite surfaces of a same porous polymer layer, which includes conductive layers thereon, it may be possible to manufacture the battery at a same time. Accordingly, a number of processes during manufacturing of the battery may be decreased, thereby reducing manufacturing time and improving productivity.

Figure 6:
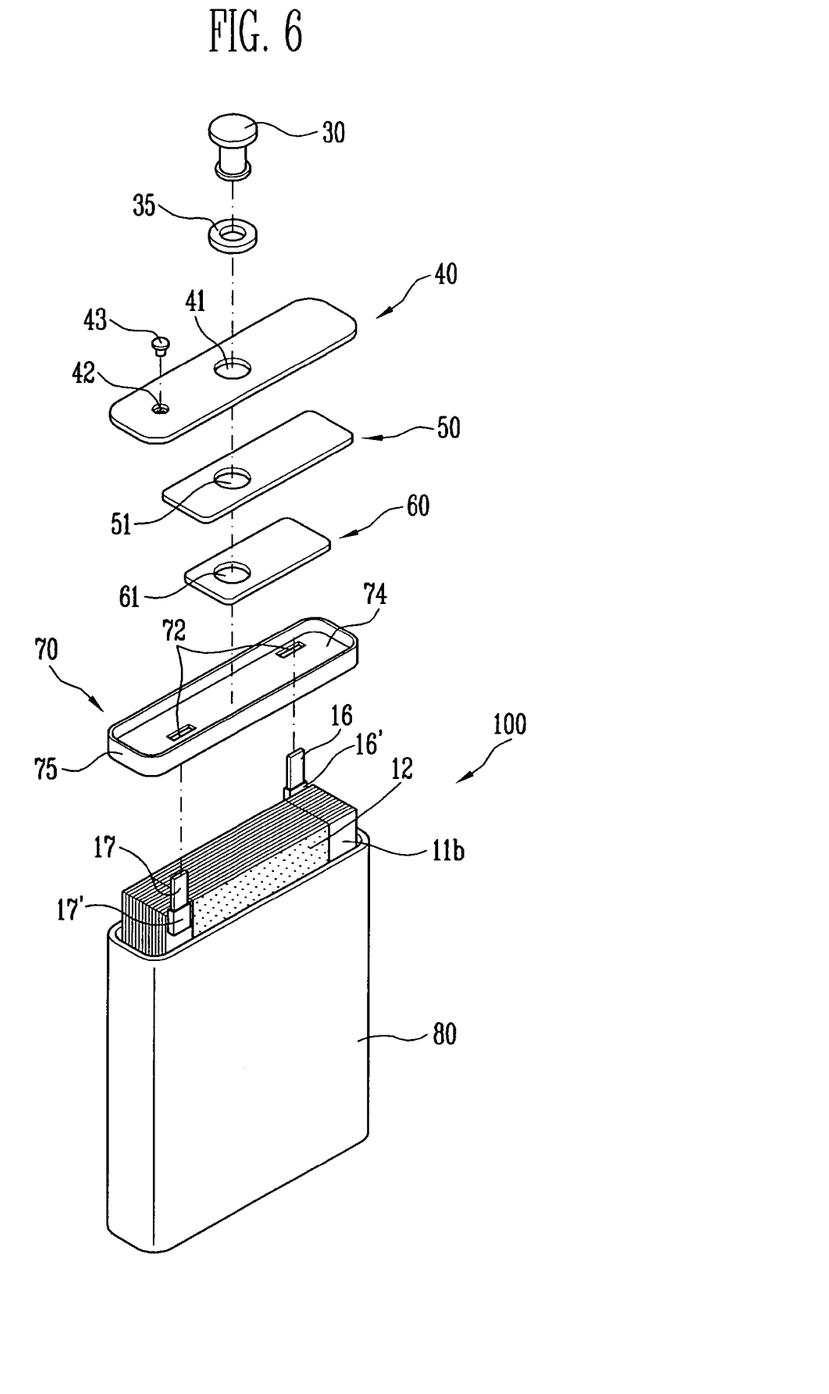
FIG. 6 illustrates an exploded perspective view of a secondary battery according to an embodiment.

FIG. 6 illustrates an exploded perspective view of a secondary battery according to an embodiment.

Referring to FIG. 6, a secondary battery according to an embodiment may include a can 80 that accommodates the electrode assembly 100 described in FIGS. 1 to 5 and an electrolyte (not shown). Further, the secondary battery may include a cap assembly that seals the can 80. For example, the electrolyte may be flame resistant. If the electrolyte is not flame resistant, it may serve as fuel if a minute short circuit occurs, thereby triggering ignition. However, when the electrolyte is flame resistant, it may not generate a secondary ignition even when an internal short circuit occurs.

The can 80 accommodates the electrode assembly 100 through an open side thereof, and a horizontal section of the can 80 may be formed, e.g., in a shape of a square having rounded corners. The horizontal sectional shape of the can 80 may not be limited thereto. Although not shown in this figure, the horizontal section of the can 80 may be formed, e.g., in a square or an elliptic shape. The can 80 may be made of, e.g., a metallic material, and may be easily manufactured, e.g., using a deep drawing method.

The cap assembly may include a cap plate 40, an electrode terminal 30, an insulating plate 50, a terminal plate 60, and a gasket 35. The cap plate 40 may form one surface of the can 80 by sealing the open side of the can 80 when the cap plate 40 is coupled to the can 80. To this end, the cap plate 40 may be coupled to the open surface using, e.g., welding. The cap plate 40 may be electrically connected to any one of the positive and negative electrode tabs 16 and 17 respectively extracted by passing through lead through-holes 72 of an insulating case 70. The cap plate 40 may be provided with a first terminal hole 41 through which the gasket 35 is coupled to the cap plate 40 and an electrolyte injection hole through which the electrolyte is injected. The electrolyte injection hole 42 is formed in the cap plate 40, and is used as a path through which the electrolyte is injected into the can 80. After the electrolyte is injected into the can 80, the electrolyte injection hole 42 may be sealed by a stopper 43.

The gasket 35 may be used to secure insulation between the electrode terminal 30 and the cap plate 40. The electrode terminal 30 may penetrate through the gasket 35 and through the first terminal hole 41.

The insulating plate 50 described above may be inserted between the cap plate 40 and the terminal plate 60 for the purpose of insulation between the cap plate 40 and the terminal plate 60. A second terminal hole 51 may be formed in the insulating plate 50 so that the electrode terminal 30 may pass through the insulating plate 50.

The terminal plate 60 may be electrically connected to the electrode terminal 30 through a third terminal hole 61. The terminal plate 60 may be electrically connected to one of the positive and negative electrode tabs 16 and 17, i.e., an electrode tab not connected to the cap plate 40. For example, when the cap plate 40 is electrically connected to the positive electrode tab 16, the terminal plate 60 may be connected to the negative electrode tab 17. Accordingly, the terminal plate 60 may relay the electrical connection between the electrode terminal 30 and the negative electrode tab 17.

The insulating case 70 may be positioned between the electrode assembly 100 and the cap assembly, so that the electrode assembly 100 and the cap assembly may be electrically isolated from each other. More specifically, the insulating case 70 may be inserted into a top portion of the can 80. The insulating case 70 may be manufactured using, e.g., a hard plastic resin with excellent electrical insulation properties. Accordingly, when the insulating case 70 is inserted into the can 80, the insulating case 70 may be hardly deformed by the electrolyte, and it may be possible to easily secure insulation between the electrode assembly 100 and the cap assembly.

When the hard plastic resin is used as the insulating case 70, it may be difficult for the insulating case 70 to be coupled to the can 80. Therefore, the insulating case 70 may include a base portion 74 and a support portion 75, so that the insulating case 70 may be stably coupled to the can 80. For example, the base portion 74 may be a bottom surface of the insulating case 70, and the support portion 75 may be an outer surface of the insulating case 70.

The base portion 74 of the insulating case 70 may be formed as a plate with a certain thickness. The base portion 74 of the insulating case 70 may be formed in a shape similar to that of the horizontal section of the can, e.g., the section of a space remaining after the electrode assembly 100 is accommodated in the can 80. The base portion 74 of the insulating case 70 may be formed to a size slightly larger than the section of the remaining space, so that the insulating case 70 may be forcibly inserted into the can 80. The electrolyte injection hole (not shown) and lead through-holes 72 may be formed in the base portion 74 of the insulating case 70.

As described above, according to embodiments, a secondary battery may include an electrode assembly having a conductive layer and a discontinuous active material layer on each surface of a same porous polymer layer. The porous polymer layer may be a single continuous layer, and may be folded in a zigzag shape to form the electrode assembly. The secondary battery may be manufactured while coating the active material on the porous polymer layer, so a number of processes may be decreased.

Thus, it may be possible to simplify manufacturing of a high-power medium- or large-sized battery. Further, it may be possible to improve productivity of secondary batteries.

In contrast, conventional electrode assemblies, e.g., jelly-roll type or stack-type, include a plurality of separate positive and negative electrode plates formed by separately coating active material layers on positive and negative electrode collectors, respectively. Further, a process of winding or stacking the separate positive and negative electrode plates, with the separator interposed therebetween, may be required.

While example embodiments have been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:
1. An electrode assembly, comprising:
a porous polymer layer having opposite first and second surfaces;
a conductive layer on each of the first and second surfaces of the porous polymer layer; and
an active material layer on each of the first and second surfaces of the porous polymer layer, the active material layer including first and second active material layers on the first and second surfaces of the porous polymer layer, respectively, the first and second active material layers being different from each other, wherein each of the first and second active material layers includes a plurality of discontinuous portions spaced apart from each other along a longitudinal direction of the porous polymer layer, wherein portions of the conductive layer are exposed between adjacent discontinuous portions of each of the first and second active material layers to define conductive non-coating portions on each of the first and second surfaces of the porous polymer layer, the conductive non-coating portions on the first surface of the porous polymer layer overlapping the conductive non-coating portions on the second surface of the porous polymer layer, and wherein the porous polymer layer has a zigzag shape, the non-coating portions being bent in alternating directions and positioned at edges of the zigzag shape.

2. The electrode assembly as claimed in claim 1, wherein the porous polymer layer includes polyethylene terephthalate (PET).

3. The electrode assembly as claimed in claim 1, wherein the conductive layer includes aluminum (Al).

4. The electrode assembly as claimed in claim 1, wherein the conductive layer is porous.

5. The electrode assembly as claimed in claim 1, wherein the conductive layer and the porous polymer layer have a ventilation rate of about 100 sec/ml to about 400 sec/ml.

6. The electrode assembly as claimed in claim 1, wherein the porous polymer layer has a thickness of about 30 μm to about 100 μm.

7. The electrode assembly as claimed in claim 1, wherein the conductive layer has a thickness of about 10 μm to about 50 μm.

8. The electrode assembly as claimed in claim 1, wherein the first and second active material layers have positive and negative polarities, respectively.

9. The electrode assembly as claimed in claim 1, wherein first and second electrode tabs are bonded to the non-coating portions.

10. The electrode assembly as claimed in claim 1, wherein the porous polymer layer is bent at the exposed portions of the conductive layer, the plurality of discontinuous portions of the active material layer overlapping each other.

11. The electrode assembly as claimed in claim 10, wherein discontinuous portions of the active material layer on the bent porous polymer layer directly facing each other have a same polarity, discontinuous portions of the active material layer on opposite surfaces of the porous polymer layer having opposite polarities.

12. The electrode assembly as claimed in claim 1, wherein the conductive layer is between the active material layer and each of the first and second surfaces of the porous polymer layer.

13. The electrode assembly as claimed in claim 12, wherein the porous polymer layer has a bent shape with the conductive non-coated portions arranged at opposite edges of the electrode assembly.

14. A secondary battery, comprising:
an electrode assembly, the electrode assembly including:
a porous polymer layer having opposite first and second surfaces,
a conductive layer on each of the first and second surfaces of the porous polymer layer, and
an active material layer on each of the first and second surfaces of the porous polymer layer;
a can configured to accommodate the electrode assembly and an electrolyte; and
a cap assembly configured to seal the can, wherein the active material layer of the electrode assembly includes first and second active material layers on the first and second surfaces of the porous polymer layer, respectively, the first and second active material layers being different from each other, wherein each of the first and second active material layers includes a plurality of discontinuous portions spaced apart from each other along a longitudinal direction of the porous polymer layer, wherein portions of the conductive layer are exposed between adjacent discontinuous portions of each of the first and second active material layers to define conductive non-coating portions on each of the first and second surfaces of the porous polymer layer, the conductive non-coating portions on the first surface of the porous polymer layer overlapping the conductive non-coating portions on the second surface of the porous polymer layer, and wherein the porous polymer layer has a zigzag shape, the non-coating portions being bent in alternating directions and positioned at edges of the zigzag shape.

15. The secondary battery as claimed in claim 14, wherein the electrolyte is flame resistant.

16. A method of manufacturing an electrode assembly, the method comprising:
coating a conductive layer on each of a first and a second surface of a porous polymer layer, the first and second surfaces being opposite each other;
coating an active material layer on each of the first and second surfaces of the porous polymer layer, such that the active material layer exposes portions of the conductive layer on each of the first and second surfaces of the porous polymer layer; and
bending the porous polymer layer in a bent structure, such that the exposed portions of the conductive layer are arranged at opposite edges of the bent structure, wherein the active material layer includes first and second active material layers on the first and second surfaces of the porous polymer layer, respectively, the first and second active material layers being different from each other, wherein each of the first and second active material layers includes a plurality of discontinuous portions spaced apart from each other along a longitudinal direction of the porous polymer layer to define the exposed portions of the conductive layer, the exposed portions of the conductive layer on the first surface of the porous polymer layer overlapping exposed portions of the conductive layer on the second surface of the porous polymer layer, and wherein the porous polymer layer has a zigzag shape, the non-coating portions being bent in alternating directions and positioned at edges of the zigzag shape.

17. The electrode assembly as claimed in claim 1, wherein the porous polymer layer is a single continuous layer defining a separator, and the plurality of discontinuous portions of the first and second active material layers defines first and second electrodes, respectively.

18. The electrode assembly as claimed in claim 17, wherein the porous polymer layer is bent at each conductive non-coating portion to define the zigzag shape, all the discontinuous portions defining the first and second electrodes being aligned and overlapping each other.

19. The electrode assembly as claimed in claim 1, wherein the porous polymer layer is a single continuous layer arranged in the zigzag shape, the conductive non-coating portions between the adjacent discontinuous portions of each of the first and second active material layers being arranged at opposite edges of the zigzag shape, and each of the discontinuous portions of the first and second active material layers being between the opposite edges of the zigzag shape.

20. The electrode assembly as claimed in claim 1, wherein the conductive layer completely covers each of the first and second surfaces of the porous polymer layer.

\* \* \* \* \*